(12) United States Patent
Lander (10) Patent No.: US 8,651,785 B1
(45) Date of Patent: Feb. 18, 2014

(54) QUICK RELEASE FASTENER (76) Inventor: Erik William Lander, Sutter Creek, CA (US)

( * ) Notice: Subject to any disclaimer, the term of this patent is extended or adjusted under 35 U.S.C. 154(b) by 85 days.

(21) Appl. No.: 13/385,681

(22) Filed: Feb. 29, 2012

Related U.S. Application Data (60) Provisional application No. 61/464,286, filed on Mar. 1, 2011.

(51) Int. Cl.
F16B 13/04 (2006.01)
(52) U.S. Cl.
USPC ............................................. 411/21; 269/49
(58) Field of Classification Search
USPC ................... 411/21, 128, 140–142, 115, 134; 292/170, 169.17; 269/54.5, 900, 10, 269/45, 47–49
See application file for complete search history.

(56) References Cited

U.S. PATENT DOCUMENTS

| 739,365 | A | 9/1903 | Vogt |
| 2,782,672 | A | 2/1957 | Davis |
| 3,238,834 | A | 3/1966 | Appleberry |
| 3,466,956 | A | 9/1969 | McCarthy |
| 4,867,427 | A | 9/1989 | Cunningham |
| 5,165,670 | A * | 11/1992 | Sawdon ........................... 269/32 |
| 5,984,291 | A * | 11/1999 | Iwata et al. ..................... 269/73 |
| 6,786,478 | B2 * | 9/2004 | Pavlik et al. .................... 269/49 |
| 6,893,184 | B2 | 5/2005 | Mills et al. |
| 6,908,077 | B2 * | 6/2005 | Sawdon ........................... 269/32 |
| 6,913,254 | B2 * | 7/2005 | Pavlik et al. .................... 269/49 |
| 7,077,610 | B2 | 7/2006 | Diaz |
| 7,153,074 | B2 | 12/2006 | Wei |
| 7,163,364 | B2 * | 1/2007 | Foscan et al. ................... 409/81 |
| 7,393,168 | B2 | 7/2008 | Wei |
| 7,774,968 | B2 * | 8/2010 | Nearman et al. ............... 40/605 |
| 8,132,799 | B2 * | 3/2012 | McIntosh et al. .............. 269/32 |
| 8,194,385 | B1 * | 6/2012 | Miller et al. ................... 361/249 |

* cited by examiner

Primary Examiner — Gary Estremsky (57) ABSTRACT

One embodiment of a quick release fastener insertable into apertures in platen tables and other surfaces, having at one end a threaded recess (30) to receive studs or bolts, and having a transversely displaceable member (60) to secure the fastener in the aperture. The displaceable member (60) is moved between the inoperative and operative positions by a tool engageable operating rod (80).

2 Claims, 8 Drawing Sheets

FIG. 1

SECTION A-A

QUICK RELEASE FASTENER

CROSS-REFERENCE TO RELATED APPLICATIONS

This application claims the benefit of provisional patent application Ser. No. 61/464,286 filed 2011 Mar. 1 by the present inventor.

BACKGROUND

Prior Art

The following is a tabulation of some prior art that appears relevant:

U.S. Patents

| Pat. No. | Kind Code | Issue Date | Patentee |
| --- | --- | --- | --- |
| 7,393,168 | B2 | Jul. 1, 2008 | Wei |
| 7,153,074 | B2 | Dec. 26, 2006 | Wei |
| 7,150,596 | B2 | May 17, 2005 | Mills et al. |
| 7,077,610 | B2 | Jul. 18, 2006 | Diaz |
| 4,867,427 |  | Jul. 1, 1989 | Cunningham |
| 3,466,956 |  | Sep. 16, 1969 | Mccarthy |
| 3,238,834 |  | Mar. 8, 1966 | Appleberry |
| 2,782,672 |  | Feb. 26, 1957 | Davis |
| 739,365 |  | Sep. 22, 1903 | Vogt |

Surfaces known as platen tables are used throughout the metalworking and equipment fabrication industries for the purposes of workholding and fixturing. They are usually in the form of planar surfaces of metal containing a plurality of apertures that extend from the near face to the far face of the surface. The apertures are most commonly of square cross section and are intended to receive portions of clamping and workholding appliances. The platen tables and the clamps are used to position and hold workpieces during welding and other operations.

The most common clamping appliances rely on friction between the wall surfaces of the apertures and the appliance, arising from a wedging action between the wall surfaces of the aperture and the appliance. U.S. Pat. No. 4,867,427 (Cunningham) is an example of a clamp that depends on friction for retention.

The appliances that rely on friction are not positively prevented from being removed from the aperture and thus their retention in the aperture is unreliable. Further, the magnitude of load forces that can be applied to them is relatively low due to the reliance of friction as a means of retaining the appliance in the aperture.

Another appliance (not shown) uses bolts with square heads that are inserted through the apertures and rotated about the axis of the bolt such that the corners of the bolt head catch on the far surface of the sheet. Another means of attaching to the sheet is by use of bolts or threaded studs with a washer and nut on the far surface of the sheet.

The bolts with square heads have very low surface areas in contact with the table, only a small portion of each corner of the bolt head is available as load bearing area, thus the amount of tensile load that may be applied is much lower than the strength of the bolt shank. Additionally, unless the bottom surface of the platen table has pockets or other features to receive the corners of the bolt heads when in the engaged position the bolts may shift in operation and one or more of the corners of the bolt head will disengage from the table, which can cause failure of the connection of the bolt to the table, possibly resulting in damage to the work and or injury to the workers.

A number of quick release fasteners have been developed that do not rely on frictional forces to retain them within the apertures they are inserted into. U.S. Pat. Nos. 3,466,965 (McCarthy), 3,238,834 (Appleberry), and 7,150,596 (Diaz et al.) are examples of the use of fasteners that have one or more members that may be extended transversely from the fastener to engage with features of the aperture for retention purposes.

The fasteners of this class suffer from a number of disadvantages:

(a) They are unsuitable for use in square holes, as they have circular cross sections with no means of preventing axial rotation within the aperture. This results in little or no engagement of the retention element(s) with the aperture and resultant failure of the connection to the aperture.

(b) They use threads on the outside diameter of the fastener combined with matching nuts or couplers as a means of applying the desired clamping or coupling forces to the fastener. These external threads are easily damaged by careless handling during use. Further, the external threads require the use of excessively large and costly nuts and couplers which often interfere with the work to be clamped.

(c) They cannot be installed flush with or below the surface of the table, which is a serious disadvantage in many applications.

(d) The fastener as a whole has much lower tensile load bearing capacity than the body of the fastener itself. This is due to the size of the retention members relative to the size of the fastener body in all of the designs known to the present inventor.

SUMMARY

In accordance with one embodiment a quick release fastener comprises an elongated body of square cross section with an aperture transverse to its longitudinal axis containing an element that can be displaced along the axis of the aperture by an operating mechanism and a threaded aperture in one end of the body

ADVANTAGES

Accordingly several advantages of one or more aspects are as follows: to provide a fastener particularly adapted to surfaces containing square apertures that can be quickly installed and removed, that provides positive retention in the aperture, can be installed below the surface it is installed in, that provides a threaded aperture in the body of the fastener for mechanical connection to the fastener.

DRAWINGS

Figures

| Drawings - Reference Numerals | |
|---|---|
| 10 | Body |
| 20 | threaded hole |
| 22 | Hole |
| 24 | Spring plunger |
| 25 | Arched Spring |
| 30 | Hole |
| 40 | Hole |
| 50 | Hole |
| 60 | Sliding member |
| 62 | Recess in sliding member 60 |
| 64 | Aperture in recess 62 of sliding member 60 |
| 70 | Linkage |
| 80 | Operating rod |
| 90 | Lock plunger |
| 92 | Spring |
| 94 | Closure plug |

DETAILED DESCRIPTION

FIGS. 1, 2, 3, 4, 9, 10—One Embodiment

Figure 1:
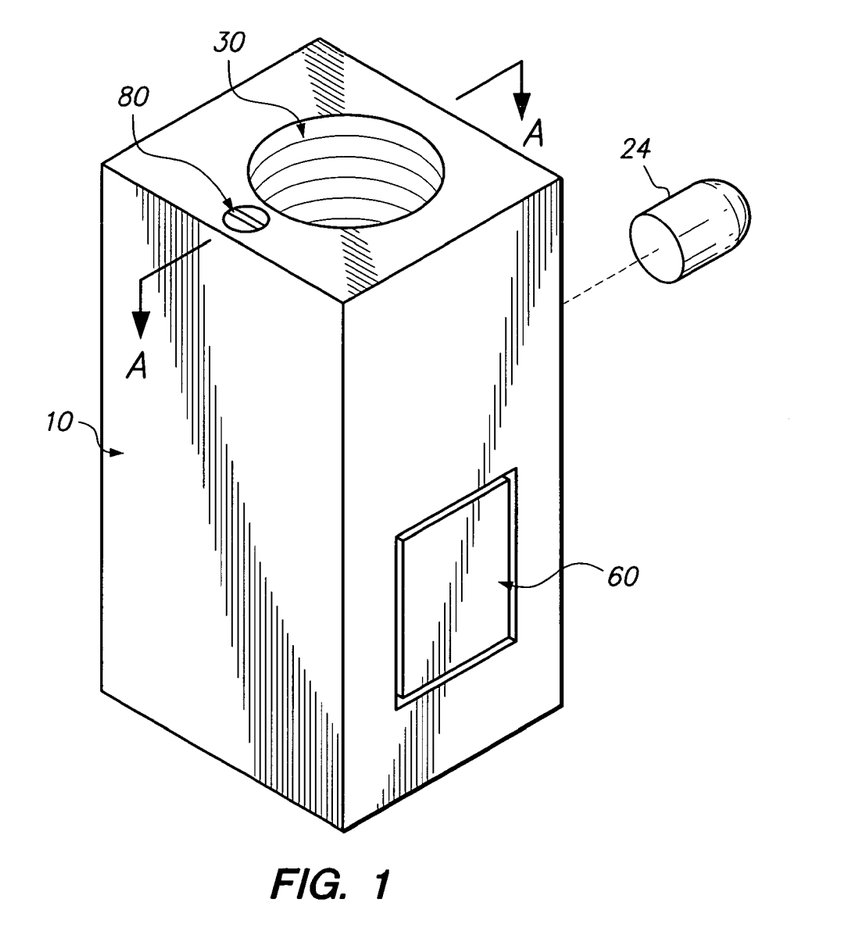
FIG. 1 shows various aspects of a fastener supplied with a transversely displaceable element, an operating mechanism for the displaceable element, a threaded aperture, and a spring plunger in accordance with one embodiment.

A perspective view of one embodiment of the fastener is illustrated in FIG. 1. It has an elongated body 10 containing multiple cavities and recesses. The upper end face has a threaded recess 30 and the tool engageable end of an operating rod 80 is accessible through an aperture in the upper face. There is an aperture in one of the side faces of the body 10 enclosing a sliding member 60 that can be extended and retracted from the body 10 by the operating rod 80. The sliding member 60 can be of various cross sections such as square, rectangular, round, etc. A spring plunger 24 is installed in a recess 22 (FIG. 2) of the body 10. In other embodiments the spring plunger 24 may be replaced by an external spring attached to the side face of body 10, one example being an arched spring.

Figure 2:
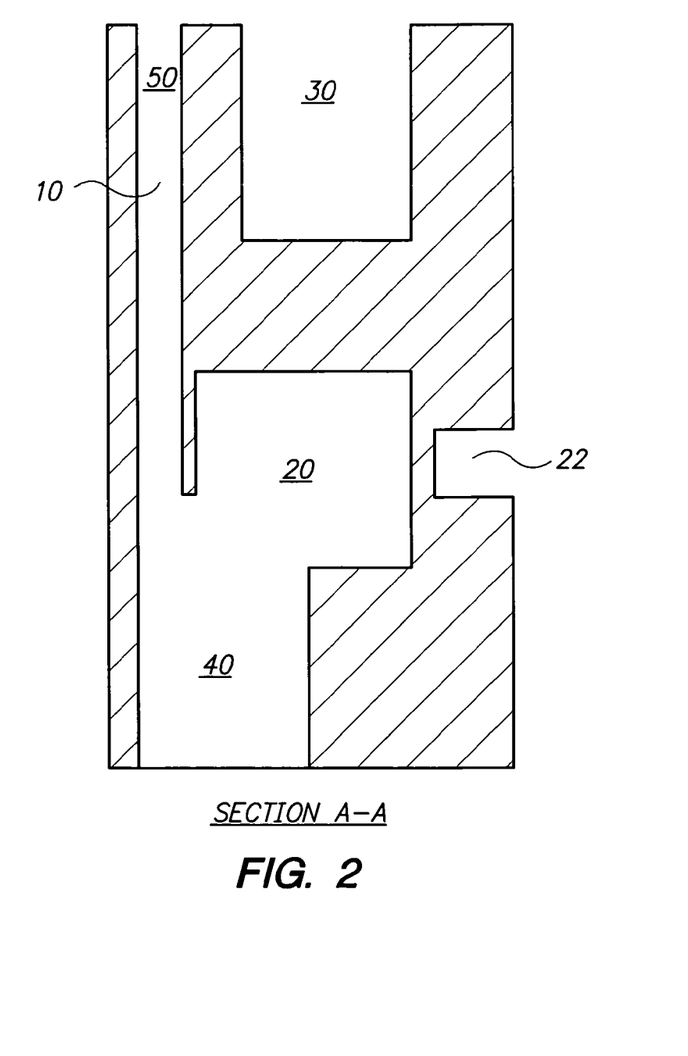
FIG. 2 shows a sectional view at section A-A of the fastener embodiment shown in FIG. 1.

FIG. 2 illustrates a cross sectional view of section A-A of FIG. 1. A passage 50 communicates with the cavity 40 and aperture 20. Recess 30 is at least partially threaded to receive bolts or studs and recess 22 has spring plunger 24 (FIG. 1) inserted within it.

Figure 3:
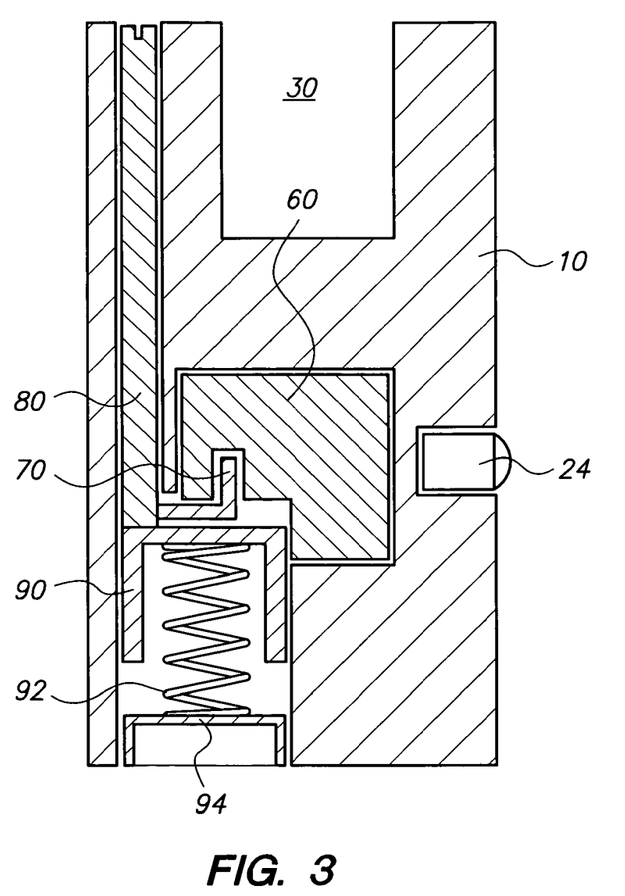
FIG. 3 shows a view of section A-A of FIG. 1 with various elements positioned within the cavities of one embodiment.

FIG. 3 illustrates the cross section A-A of FIG. 1 with the internal elements in position. Operating rod 80 is positioned within cavity 50 (FIG. 2) and is connected via linkage 70 to the recess 64 (FIG. 4) of sliding member 60. Lock plunger 90 in recess 40 of body 10 is driven upward by spring 92 bearing on plug closure 94 into the recess 62 (FIG. 4) of sliding member 60.

Figure 4:
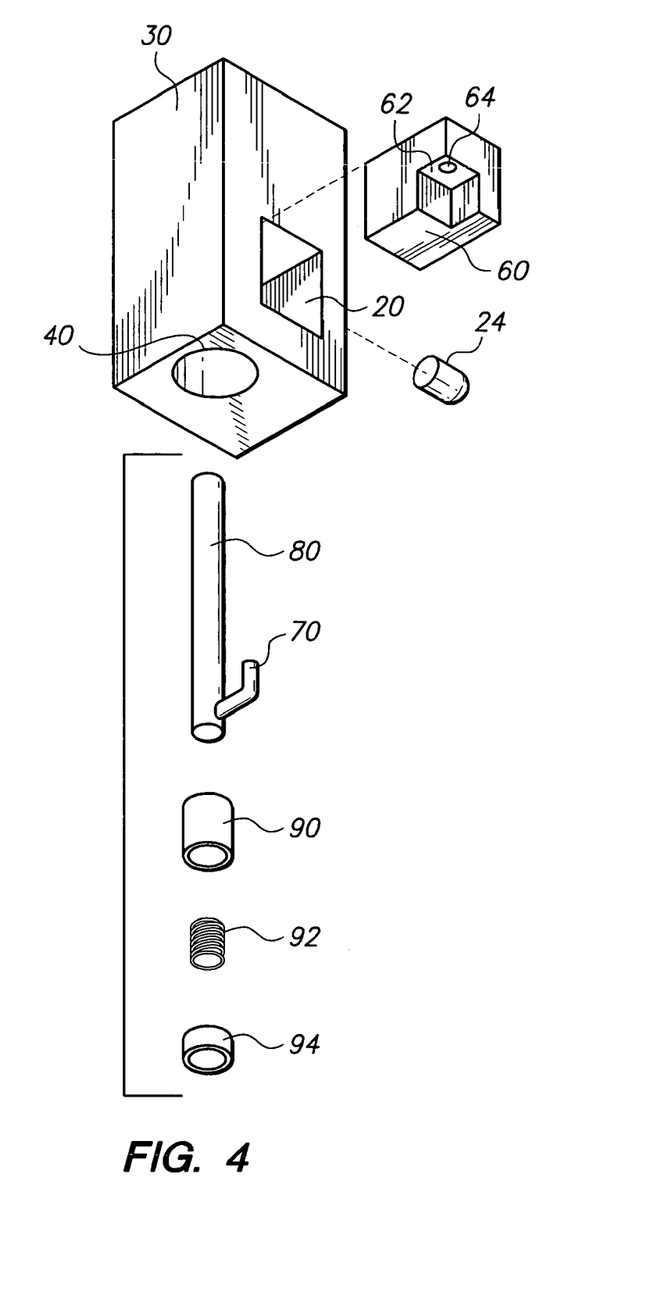
FIG. 4 is an exploded view of the internal elements of one embodiment.
Figure 5:
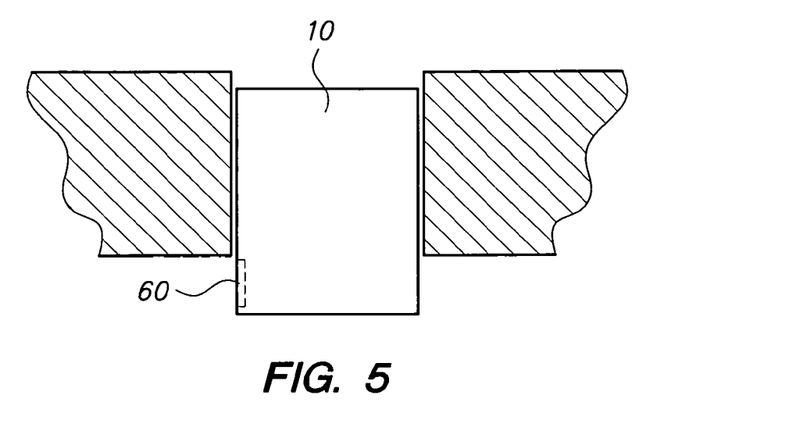
FIG. 5 is a side view of one embodiment in the inoperative position.

FIG. 4 is an exploded view of the fastener elements. Operating rod 80 with linkage 70 is inserted through aperture 40 and thence into position within aperture 50 (FIG. 2). The free end of linkage 70 is positioned within aperture 64 of sliding member 60. Once operating rod 80 is positioned, lock plunger 90, spring 92, and closure plug 94 are inserted into aperture 40. Spring plunger 24 is positioned within recess 22 (FIG. 2) on one of the side faces of body 10.

Figure 9:
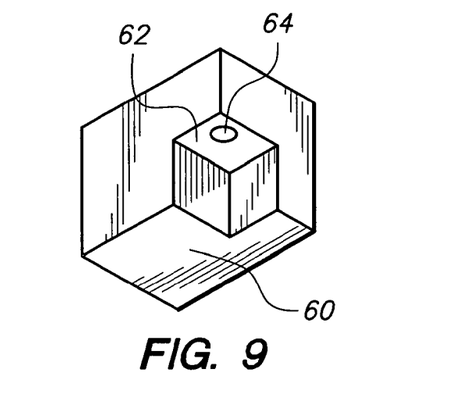
FIG. 9 is a perspective view of the underside of the sliding member of one embodiment.

FIG. 9 is a perspective view of the under side of sliding member 60 illustrating the recess 62 and the recess 64 in communication with recess 62.

Figure 10:
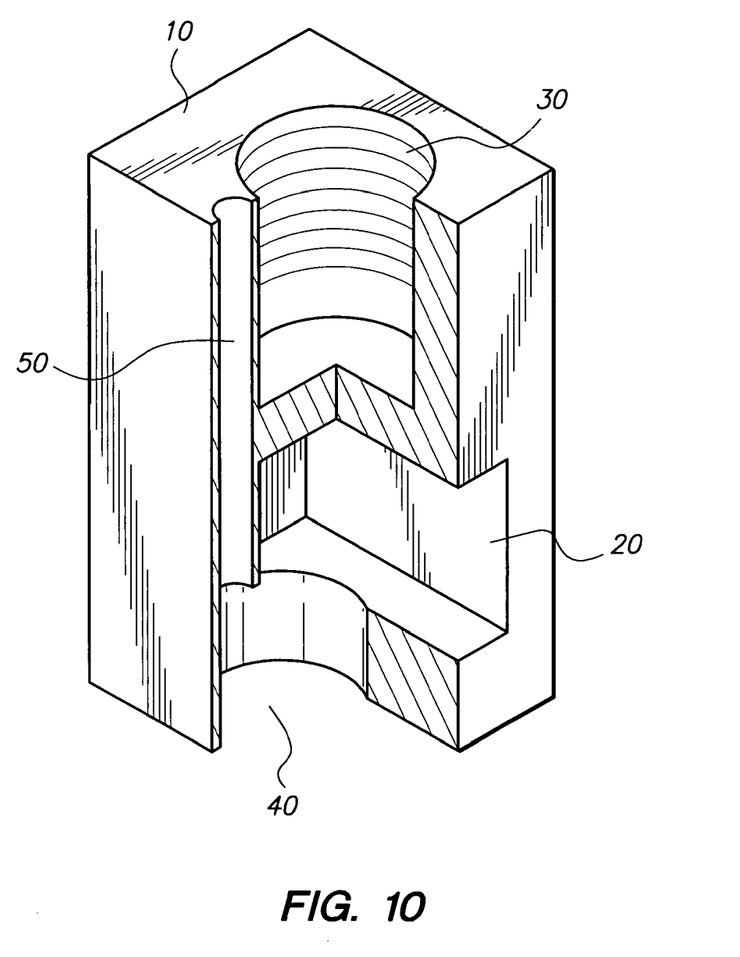
FIG. 10 is a perspective cutaway view of the body and internal cavities of one embodiment.
Figure 11:
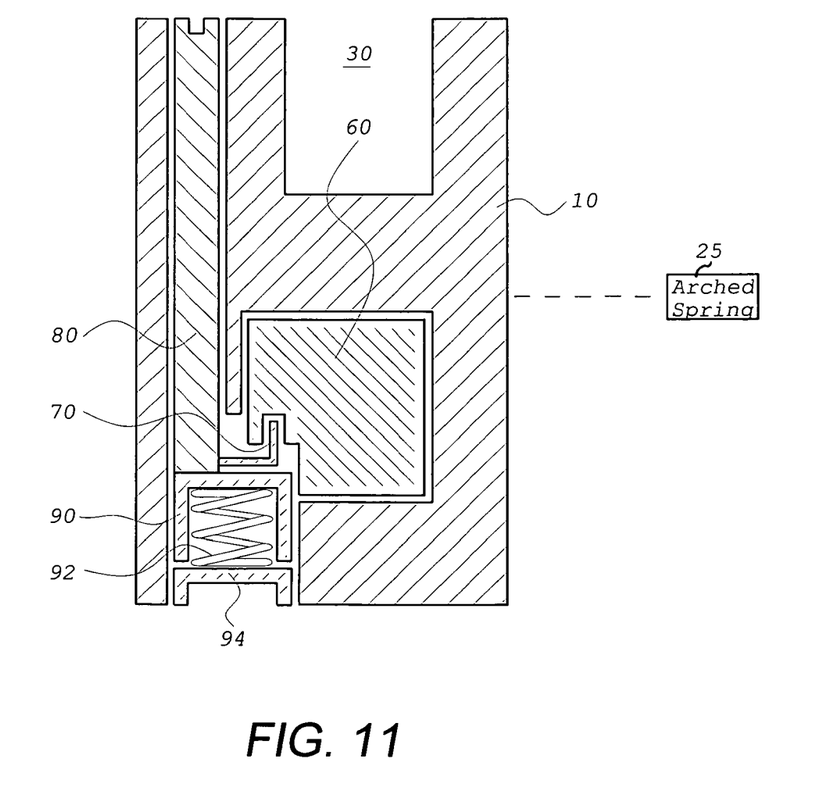
FIG. 11 shows a view of section A-A of FIG. 1 of an embodiment with an arched spring.

FIG. 10 is a cutaway perspective view of the body 10. It illustrates the apertures 20, 40, and 50 and clearly shows how they communicate. Also shown is the threaded recess 30.

Operation—FIGS. 3, 5, 6, 7, 8, 9

Figure 7:
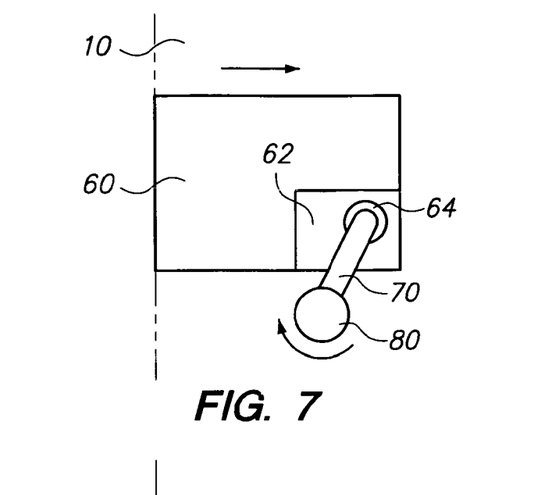
FIG. 7 is an underside view of the sliding member of one embodiment in the inoperative position and showing the operating rod and linkage of the sliding member.
Figure 8:
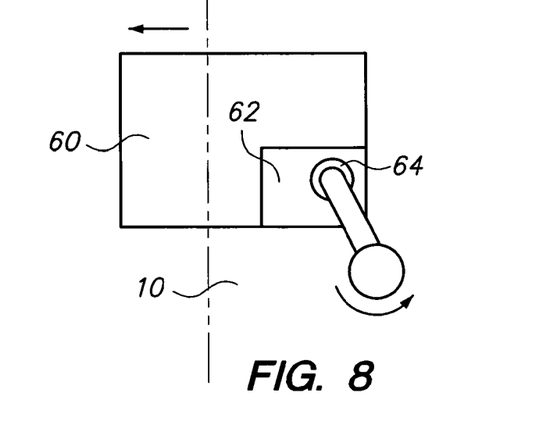
FIG. 8 is an underside view of the sliding member of one embodiment in the operative position and showing the operating rod and linkage of the sliding member.

In operation the sliding member 60 is first retracted within the body 10 of the fastener. To retract the sliding member the operating rod 80 (FIG. 3) is pushed down, which then displaces the lock plunger 90 (FIG. 3) from the recess 62 (FIG. 9) of the sliding member. The travel of the lock plunger is limited by contact with the closure plug 94 (FIG. 3) such that the free end of the linkage 70 (FIG. 7) remains within the aperture 64 (FIG. 7). Then the operating rod 80 (FIG. 7) is rotated and the linkage 70 causes the sliding member to be retracted to the inoperative position within the body (FIG. 7)

The body is then inserted into an aperture in the platen table (FIG. 5) where it is retained by friction between spring plunger 24 (FIG. 3) and the wall of the aperture in the platen table.

Figure 6:
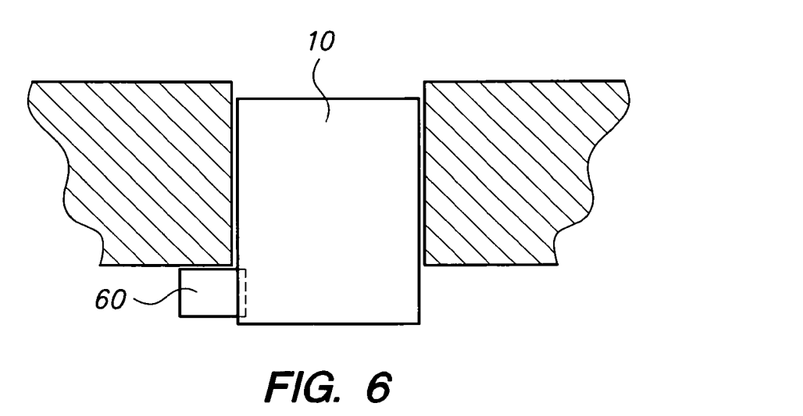
FIG. 6 is a side view of one embodiment in the operative position.

To place the fastener into the operative position the sliding member 60 is then extended from the body 10 (FIG. 6) by rotating the operating rod 80 (FIG. 8) to extend the sliding member 60 (FIG. 8) into the operative position. FIG. 6 shows the sliding member 60 in the operative position and engaging the under surface of the platen table.

When the sliding member 60 is in the operative position the spring 92 (FIG. 3) drives the lock plunger 90 (FIG. 3) up and into the recess 62 (FIG. 8) of sliding member 60 (FIG. 8), and the sliding member 60 cannot be moved to the inoperative position by other than the retraction sequence described above.

CONCLUSIONS, RAMIFICATIONS, AND SCOPE

Accordingly, the reader will see that the quick release fastener of the various embodiments can be used to quickly and securely clamp workpieces and fixtures to platen tables or other surfaces. It can be installed and removed from one side of the platen table or other surface, without the need for access to the other face of the surface. It does not protrude above the surface of the table. It is positively retained by mechanical engagement in the aperture.

It has a threaded recess that provides a universal attachment point for clamping and fixturing components. It can sustain very high tensile clamping forces.

Although the description above contains many specificities, these should not be construed as limiting the scope of the embodiments but as merely providing illustrations of some of several embodiments. For example, the sliding member can have other shapes such as round, rectangular, etc. The spring plunger can be replaced with various forms of external springs, the body can have other cross sections such as rectangular, round, etc.

Thus the scope of the embodiments should be determined by the appended claims and their legal equivalents, rather than by the examples given.

I claim:

1. A quick release fastener comprising: an elongated body of square cross section having an at least partially threaded recess whose axis lies along the longitudinal-axis of said body, a spring plunger within a recess in one side face of said body, an aperture of predetermined cross section in said body, with the axis of the aperture transverse to the longitudinal axis of the body, said aperture having within it a member displaceable within the aperture, with a means of actuating the displaceable member comprising a rod and linkage connected to the displaceable member.

2. A quick release fastener comprising: an elongated body of square cross section having an at least partially threaded recess whose axis lies along the longitudinal axis of said body, a spring of arched form attached to at least one of the longitudinal faces of the body, an aperture of predetermined cross section in said body, with the axis of the aperture transverse to the longitudinal axis of the body, said aperture having within it a member displaceable within the aperture, with a means of actuating the displaceable member comprising a rod and linkage connected to the displaceable member.

* * * * *